V. A. FYNN.
POWER TRANSMITTING APPARATUS.
APPLICATION FILED MAY 9, 1916.

1,321,617.

Patented Nov. 11, 1919.

WITNESS
W. A. Alexander.

INVENTOR
Valère A. Fynn
BY
E. E. Huffman
ATTORNEY

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

POWER-TRANSMITTING APPARATUS.

1,321,617.   Specification of Letters Patent.   Patented Nov. 11, 1919.

Application filed May 9, 1916. Serial No. 96,286.

*To all whom it may concern:*

Be it known that I, VALÈRE A. FYNN, a subject of the King of England, residing at the city of St. Louis, State of Missouri, United States of America, have invented a certain new and useful Power-Transmitting Apparatus, of which the following is such a full, clear, and exact description as will enable any one skilled in the art to which it appertains to make and use the same, reference being had to the accompanying drawings, forming part of this specification.

My invention relates to the transmission of power and the control thereof, more particularly in connection with self-propelled vehicles in which the prime mover is an internal combustion engine.

Because the torque of an internal combustion engine is very small at low speeds, reaches a maximum with increasing speed, and then diminishes again, it has been found necessary to change the gear ratio between the engine and the vehicle wheels, in order to start such vehicles and to drive them over heavy roads or up steep grades. This change is usually carried out by means of a hand-operated gear shifting lever. In order to dispense with this lever and gearing and the disadvantages connected therewith, and in order, also to increase the number of available transmission ratios between engine and wheels, the substitution of electromagnetic variable ratio transmission apparatus for the mechanical gearing has heretofore been proposed.

My invention relates to improvements in such electromagnetic transmission apparatus, and has for its object to make the necessary changes in transmission ratio very gradual and entirely automatic, over a wide range, thus reducing the necessary manipulation of the electrical circuits by the operator to a minimum.

Figure 1:
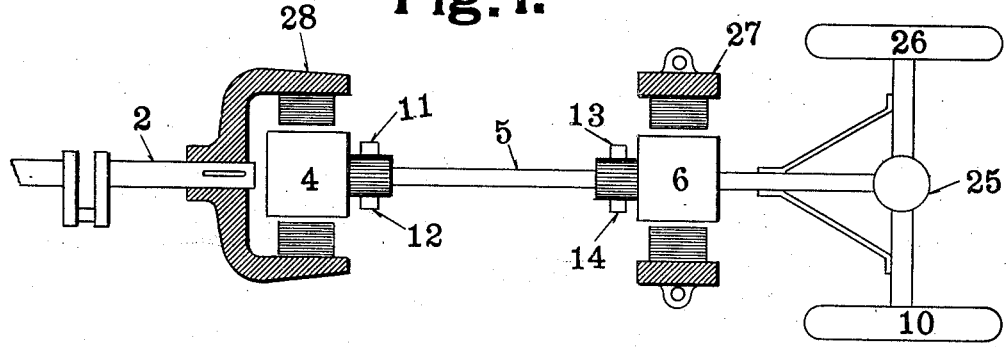
Figure 2:
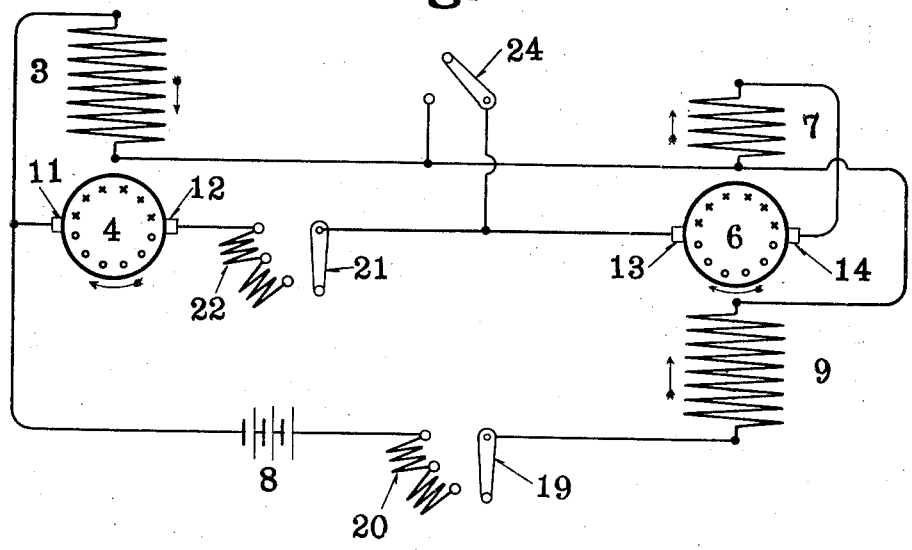

Referring to the accompanying drawings, Figure 1 is a diagrammatic representation of the mechanical disposition of a known form of electromagnetic transmission apparatus to which my invention can be applied, and Fig. 2 shows how the electrical circuits can be arranged and connected to apply my invention to the form of transmission shown in Fig. 1.

Referring to the drawings, I will more particularly describe my invention as applied to that form of electromagnetic transmission apparatus which is shown in Fig. 1. In this figure, 2 represents the engine shaft to which is coupled the field structure 28 of a dynamo electric machine the armature 4 of which is coupled to the shaft 5 which drives the vehicle wheels 26, 10, through the differential 25. To this shaft is also coupled the armature 6 of a second dynamo electric machine the field structure 27 of which is attached to the vehicle frame and is prevented from revolving about the armature 6 with which it coöperates. Heretofore, in order to operate such a transmission, the two dynamo electric machines have usually been connected in series, and means provided for varying the field ampere turns of the motor, and sometimes also those of the generator. The term "generator" is usually applied to that dynamo electric machine both members of which are rotatable, and the term "motor" to the one in which one of the members is stationary. In order to reduce the wheel speed and increase the torque applied to the latter, without being obliged to change the speed of the engine, it is necessary to increase the motor excitation. The same result can, however, to some extent, be achieved by decreasing the generator excitation, the effect in this case being limited by the fact that a decrease of the generator excitation will necessarily decrease the amount of power transmitted. The two methods can also be combined, in order to achieve the desired results. After the driven shaft has reached a sufficiently high speed, it has been usual to rely on the generator only, and make use of it as a dynamo electric coupling by short circuiting it on itself. In order to apply this known form of control, just described, it is necessary to make use of somewhat complicated switches and sometimes of several sets of adjustable resistances.

In carrying out my invention, I preferably make use of a series wound generator and connect same to a motor. I further provide this motor with a field winding connected across the generator field winding and in circuit with a source of current other than the generator. This motor may or may not have an additional field winding.

In Fig. 2 the generator armature 4, provided with the brushes 11, 12, is connected in series with the generator field winding 3, also in series with one of the motor field windings 7, and with the motor armature 6 provided with the brushes 13, 14. The regulating motor field winding 9 is connected at one end to one terminal of the generator field winding 3 of the series generator, while the other end of 9 is connected to the other terminal of said generator winding through the storage battery 8. The regulating field circuit also comprises a switch lever 19, by means of which this circuit may be interrupted or a certain amount of resistance 20 inserted therein. A switch 21 is provided between the two armatures, 4 and 6, and is adapted to either interrupt the armature circuit or to insert a certain amount of resistance 22 therein. Another switch 24 is connected to short circuit the series generator on itself when closed. I may or may not make use of the motor field winding 7. If used, it may be connected to magnetize in the same direction as the winding 9, when the transmission apparatus is exerting its maximum torque, or it may be connected to magnetize in the opposite direction. Whenever I do make use of this field winding 7, I prefer to so dimension same as to make the maximum magnetization it can produce less than the maximum magnetization which can be produced by the winding 9. The source of current 8 is so connected as to oppose the difference of potential appearing at the terminals of the generator field winding 3, when a current circulates through said winding.

Assuming that the motor field winding 7 is not used, the mode of operation of my improved transmission is as follows:

The prime mover may be started in some convenient manner, the switches 19, 21 and 24 being open. Under these conditions, the field of the generator will be revolving at the same speed as the shaft of the prime mover, while the armatures of the generator and the motor and the motor field structure 27 will be stationary. When it is desired to begin to transmit power to the driven shaft, switch 21 must be, and switch 19 may be, closed, and the resistances 22 and 20 partly or entirely cut out. The closing of switch 21 will enable the series generator to become excited and to send a current through the motor armature 6. Under these conditions, a torque, due to the interaction of the generator field 28 and the armature 4, will be transmitted to the driven shaft 5. The closing of switch 19 will enable an exciting current to flow through the motor winding 9, the magnitude and direction of said current depending on the magnitude and direction of the E. M. F. at the terminals of the storage battery 8 and the E. M. F. at the terminals of the series winding 3. As soon as the field structure of the motor becomes excited, this machine also develops a torque the direction of which may be the same as that of the torque produced by the generator or opposed to it. I prefer to so proportion my apparatus that when the vehicle wheels 26, 10 are locked, and the engine is running, the difference of potential at the terminals of 3 exceeds that at the terminals of 8. I also prefer to so connect the auxiliary winding 9 that the resulting current in the auxiliary circuit will magnetize the motor field in a direction to cause the torque of this machine to be added to the torque produced by the generator, both torques being applied to the vehicle wheels. As the vehicle begins to move, so will the current in the generator field 3 diminish, bringing about a reduction of current in the auxiliary exciting circuit. This reduction is brought about because the potential at the terminals of the storage battery varies but little while that at the terminals of the series winding 3 diminishes with the current flowing through that winding. As the current in the auxiliary winding is reduced, so will the magnetization of the motor be decreased, causing the latter to run at a higher speed and consequently also raising the speed of the vehicle. The proportions can readily be so chosen that at a speed less than the maximum, the E. M. F. at the terminals of the generator field winding 3 equals that at the terminals of the storage battery, when no current will flow through the motor exciting winding 9. When the winding 9 carries no current, then the only torque transmitted to the wheels is that due to the generator, and the motor armature 6 merely acts as a resistance in the circuit of said generator. At such time it may as well be short circuited, thus reducing the resistance in the generator circuit and consequently its slip. Switch 24 serves this purpose. If the proportions have been so chosen that the E. M. F. at the terminals of winding 3 equals the battery E. M. F. at less than the maximum vehicle speed, then a further increase in speed will put the storage battery 8 in control of the regulating circuit and cause the motor to be magnetized in the reverse direction. When the speed rises so high that the current through 9 is reversed, then the torque of the motor is reversed. It produces an E. M. F. in the same direction as that produced by the generator, and the speed of the latter, and therefore the speed of the driven shaft, rises above the speed of the driving shaft, in an effort to reëstablish a balance by reversing the direction of the E. M. F. generated by the generator. Under these conditions the driven shaft will run at what may be termed a "supersynchronous" speed. It will be understood that with the throttle of the prime mover wide open, the speed of a vehicle provided with this improved system will vary over very wide ranges, in accordance with road conditions, the resulting speed always being as high as the power of the engine will allow. The driver is, however, not bound to allow the vehicle to run at the speed it would automatically assume under these conditions, but can regulate same over extremely wide ranges by regulating the prime mover. In case said prime mover is an internal combustion engine, he can do this by regulating the fuel valve opening, or in other well understood ways.

Should the driver desire to dispense with the automatic torque and speed varying features of this system, it is only necessary for him to open switch 19, and it is best to also close switch 24. Under these conditions the motor will be inactive, and the series generator will act as a simple clutch generator.

When applying the brakes it is, of course, desirable to render the electromagnetic transmission inoperative. This can always be achieved by opening switch 21, and when the winding is in use it is desirable to also open switch 19.

If the motor is provided with a winding 7 included in the generator circuit, as well as with a regulating winding 9, and if these windings are arranged to magnetize in the same direction under maximum torque conditions, then the maximum speed obtainable with switch 24 open and switches 19 and 21 closed, will be lower than that which can be reached without the use of the winding 7. If the winding 7 is made use of and it is arranged to oppose the magnetization of 9 under maximum torque conditions, then the maximum obtainable speed with switch 24 open, will be greater than that which can be reached without the use of the winding 7. Otherwise the operation of the apparatus will be the same as described for the arrangement in which winding 7 is omitted.

It will be noted that as long as the flow of current through the auxiliary circuit is under the control of the difference of potential existing at the terminals of the generator winding 3, the storage battery 8 absorbs energy. When the storage battery is in control of the auxiliary circuit, it discharges, thus giving out the energy which it absorbs under other conditions. This battery may, of course, be made use of for other purposes, such as lighting or starting, for it is most likely to be charged more frequently than discharged.

The characteristics of the automatic variable ratio transmission herein described, can be altered to some extent by including more or less of the resistance 22 in the armature circuit, or more or less of the resistance 20 in the auxiliary or regulating circuit. Both methods are, however, wasteful, in that a certain amount of energy will be uselessly dissipated in the resistance used for this control.

Having fully described my invention, what I claim as new and desire to secure by Letters Patent of the United States is:—

1. In an apparatus of the character described, the combination of a prime mover, a driven shaft, a series generator having one element driven by the prime mover and the other mechanically connected to the driven shaft, a motor connected to receive electrical energy from the generator and having one element connected to the driven shaft, an exciting winding for the motor, a source of E. M. F. independent of the motor and generator, and an exciting circuit including the motor exciting winding, the source of E. M. F. and a part at least of the field winding of the generator.

2. In an apparatus of the character described, the combination of a prime mover, a driven shaft, a generator having one element driven by the prime mover and the other mechanically connected to the driven shaft, a motor connected to receive electrical energy from the generator and having one element connected to the driven shaft, an exciting circuit comprising a motor exciting winding, and a source of E. M. F. independent of the motor and generator, said exciting circuit being connected to the terminals of the field winding of the generator, and the source of independent E. M. F. being connected to oppose the E. M. F. at the terminals of the generator field winding.

3. In an apparatus of the character described, the combination of a prime mover, a driven shaft, a series generator having one element driven by the prime mover and the other mechanically connected to the driven shaft, a motor connected to receive electrical energy from the generator and having one element connected to the driven shaft, said motor having an exciting winding connected in parallel circuit with the field winding of the generator, and a source of current other than the generator in circuit with said exciting winding.

4. In an apparatus of the character described, the combination of a prime mover, a driven shaft, a series generator having one element driven by the prime mover and the other mechanically connected to the driven shaft, a motor connected to receive electrical energy from the generator and having one element connected to the driven shaft, said motor having an exciting winding connected in parallel with the field winding of the generator, and means for automatically reversing the current through said exciting winding.

5. In an apparatus of the character described, the combination of a prime mover, a driven shaft, a generator having one element driven by the prime mover and the other mechanically connected to the driven shaft, a motor connected to receive electrical energy from the generator and having one element connected to the driven shaft, and an exciting circuit comprising a motor exciting winding, an adjustable resistance, a source of E. M. F. independent of the motor and generator, and a part at least of the field winding of the generator.

6. In an apparatus of the character described, the combination of a prime mover, a driven shaft, a generator having one element driven by the prime mover and the other mechanically connected to receive electrical energy from the generator and having one element connected to the driven shaft, said motor having an exciting winding connected in a parallel circuit with the field winding of the generator, and a source of substantially constant E. M. F. in said last named circuit, said E. M. F. being less than the maximum E. M. F. appearing at the terminals of the generator field winding and connected to oppose the same.

7. In an apparatus of the character described, the combination of a prime mover, a driven shaft, a generator having one element driven by the prime mover and the other mechanically connected to receive electrical energy from the generator and having one element connected to the driven shaft, said motor having an exciting winding connected in parallel circuit with the field winding of the generator, and a source of substantially constant E. M. F. in said last named circuit, said E. M. F. being less than the maximum and greater than the minimum E. M. F. appearing at the terminals of the generator field winding and connected to oppose the same.

8. In an apparatus of the character described, the combination of a prime mover, a driven shaft, a generator having one element driven by the prime mover and the other mechanically connected to the driven shaft, a motor connected to receive electrical energy from the generator and having one element connected to the driven shaft, an exciting winding for the motor, and means for applying to said winding an E. M. F. equal to the difference between a substantially constant E. M. F. and an E. M. F. varying with the current in the armature circuit of the generator.

9. In an apparatus of the character described, the combination of a prime mover, a driven shaft, a generator having one element driven by the prime mover and the other mechanically connected to the driven shaft, a motor connected to receive electrical energy from the generator and having one element connected to the driven shaft, an exciting winding for the motor, and means for applying to said winding an E. M. F. equal to the difference between an E. M. F. derived from a source independent of the generator or motor and an E. M. F. derived from the generator.

10. In an apparatus of the character described, the combination of a prime mover, a driven shaft, a series generator having one element driven by the prime mover and the other mechanically connected to the driven shaft, a motor having its armature connected in series with the generator and having one element mechanically connected to the driven shaft, an exciting winding for the motor, a source of E. M. F. independent of the generator and motor, and a circuit comprising the series exciting winding of the generator, the motor exciting winding and the independent source of E. M. F.

11. In an apparatus of the character described, the combination of a prime mover, a driven shaft, a series generator having one element driven by the prime mover and the other mechanically connected to the driven shaft, a series motor connected to the generator and having one element mechanically connected to the driven shaft, an additional exciting winding for the motor, a source of E. M. F. independent of the generator and motor, and a circuit comprising said exciting winding, the independent source of E. M. F., and the series field winding of the generator.

In testimony whereof, I have hereunto set my hand and affixed my seal.

VALÈRE A. FYNN. [L. S.]